United States Patent
Leijon et al.

(10) Patent No.: US 7,045,912 B2
(45) Date of Patent: May 16, 2006

(54) WAVE-POWER ELECTRIC DEVICE AND METHOD

(75) Inventors: Mats Leijon, Uppsala (SE); Hans Bernhoff, Uppsala (SE)

(73) Assignee: Swedish Seabased Energy AB, Uppsala (SE)

( * ) Notice: Subject to any disclaimer, the term of this patent is extended or adjusted under 35 U.S.C. 154(b) by 0 days.

(21) Appl. No.: 10/501,068

(22) PCT Filed: Dec. 19, 2002

(86) PCT No.: PCT/SE02/02404

§ 371 (c)(1),
(2), (4) Date: Aug. 19, 2004

(87) PCT Pub. No.: WO03/058054

PCT Pub. Date: Jul. 17, 2003

(65) Prior Publication Data

US 2005/0121915 A1 Jun. 9, 2005

(30) Foreign Application Priority Data

Jan. 10, 2002 (SE) .................................. 0200066
Feb. 28, 2002 (SE) .................................. 0200613

(51) Int. Cl.
*F03B 13/12* (2006.01)

(52) U.S. Cl. .......................... 290/42; 290/53

(58) Field of Classification Search ................ 290/42, 290/53; F03B 13/12
See application file for complete search history.

(56) References Cited

U.S. PATENT DOCUMENTS

| | | | |
|---|---|---|---|
| 3,014,139 A * | 12/1961 | Shildneck .................... 310/64 |
| 4,208,877 A * | 6/1980 | Evans et al. ................... 60/495 |
| 4,228,360 A * | 10/1980 | Navarro ........................ 290/43 |
| 4,242,593 A * | 12/1980 | Quilico et al. ................ 290/53 |
| 4,256,970 A | 3/1981 | Tomassini |
| 4,539,484 A * | 9/1985 | Suggs .......................... 290/53 |
| 4,900,965 A * | 2/1990 | Fisher ........................ 310/216 |
| 5,036,165 A * | 7/1991 | Elton et al. ........... 174/102 SC |
| 5,176,552 A | 1/1993 | Kuboyama et al. |
| 5,324,988 A | 6/1994 | Newman |
| 5,424,582 A * | 6/1995 | Trepl et al. .................... 290/53 |
| 5,435,134 A * | 7/1995 | Nielsen ........................ 60/398 |
| 5,808,368 A * | 9/1998 | Brown ......................... 290/53 |
| 5,909,060 A | 6/1999 | Gardner |
| 5,929,531 A * | 7/1999 | Lagno .......................... 290/53 |
| 6,278,217 B1 * | 8/2001 | Kliman et al. .............. 310/254 |
| 6,864,592 B1 * | 3/2005 | Kelly ........................... 290/42 |

FOREIGN PATENT DOCUMENTS

| | | |
|---|---|---|
| DE | 3112040 | 1/1983 |
| DE | 31 12040 | 1/1993 |
| DE | 100 35 215 | 3/2001 |

(Continued)

*Primary Examiner*—Joseph Waks
(74) *Attorney, Agent, or Firm*—Dykema Gossett PLLC

(57) ABSTRACT

The present invention relates to a wave-power unit having a floating body (3) and a rotating electric generator (5) mechanically connected to the floating body (3). In accordance with the invention a mechanically movement transmitting means (4) is arranged for transmission of vertical movements of the floating body (3) to rotary movements of the generator rotor. The invention also relates to a wave-power plant composed of a number of wave-power units in accordance with the invention. The invention also relates to the use of the claimed wave-power unit and method of generating electric energy.

42 Claims, 6 Drawing Sheets

FOREIGN PATENT DOCUMENTS

| | | |
|---|---|---|
| DE | 10035215 | 3/2001 |
| EP | 0 483 357 | 5/1992 |
| EP | 0483357 | 5/1992 |
| FR | 2521646 A1 * | 8/1983 |
| GB | 2 351 124 | 12/2000 |
| GB | 2351124 | 12/2000 |
| SU | 1268789 A * | 11/1986 |
| WO | WO 03098033 A1 * | 11/2003 |

* cited by examiner

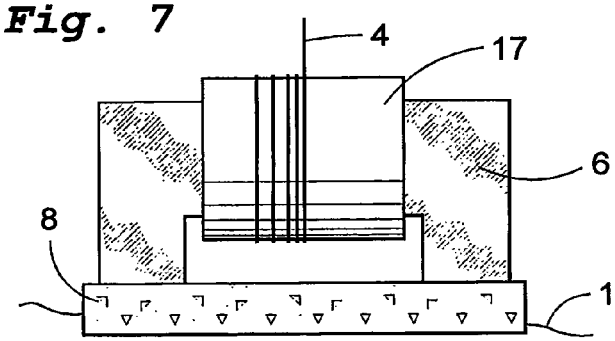
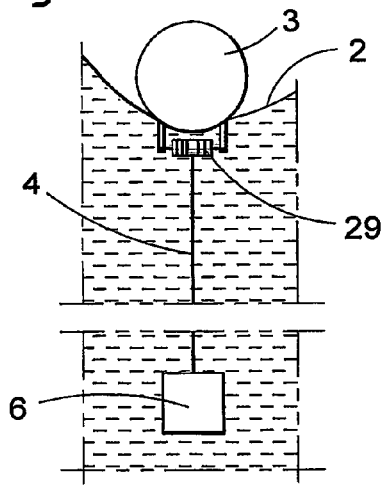
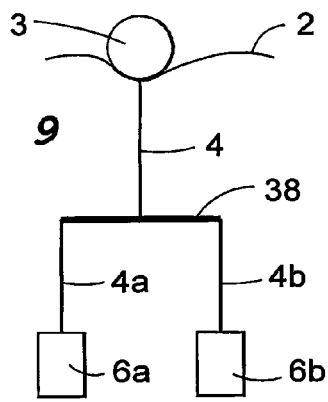
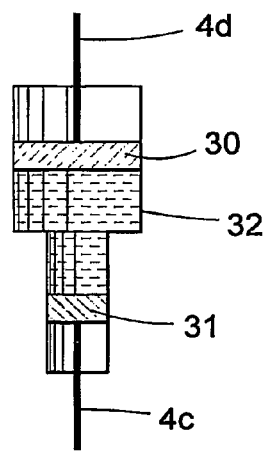
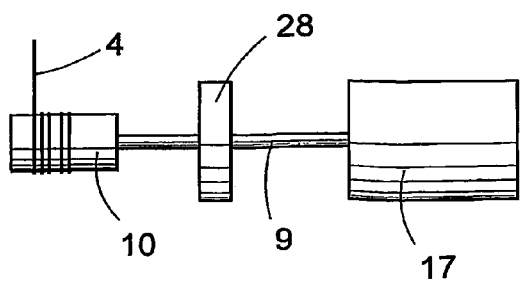

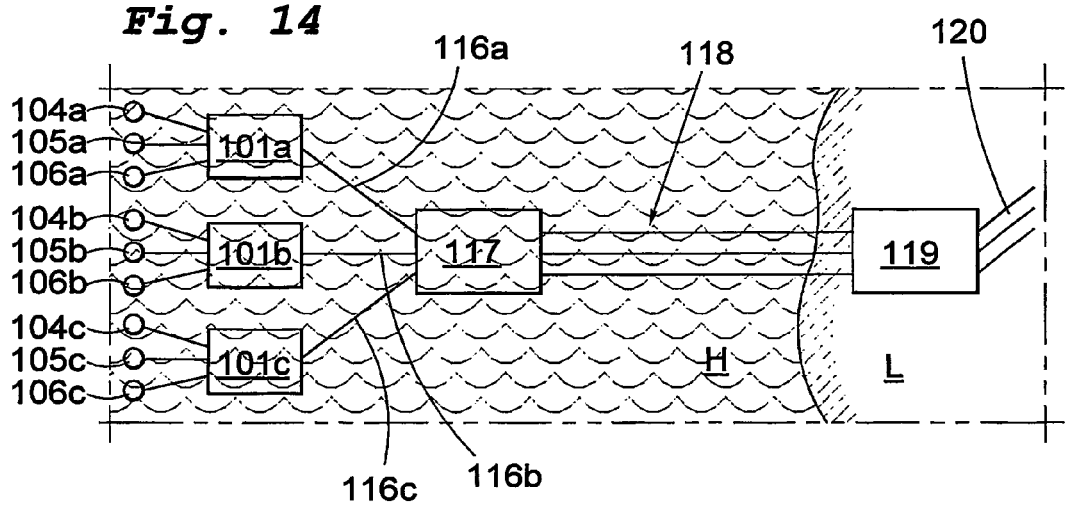

WAVE-POWER ELECTRIC DEVICE AND METHOD

BACKGROUND OF THE INVENTION

1. Technical Field

A first aspect of the present invention relates to a wave-power unit for the production of electric power, comprising a floating body and a rotating electric generator connected to the floating body.

A second aspect of the invention relates to a wave-power plant comprising a plurality of wave-power units in accordance with the invention.

A third aspect of the invention relates to the use of the claimed wave-power unit for producing electric current.

A fourth aspect of the invention, finally relates to a method of generating electric power by mechanically connecting a floating body to an electric generator.

The wave-power unit in accordance with the invention is primarily intended for, but not limited to, applications up to 500 kW.

2. Background Art

Wave movement in the sea and in large inland lakes constitutes a potential source of energy that has scarcely been exploited so far. The available wave energy is dependent on the height of the waves, and naturally differs in different locations. The average wave energy during a year is dependent on the various wind conditions, which are greatly influenced by the distance of the location from the nearest coast. Measurements have been carried out in the North Sea, for instance. At one measuring point approximately 100 km west of the coast of Jylland, Denmark, where the depth was about 50 m, wave heights were measured over a long period of time and the available energy was calculated. The following table was obtained:

| Height of wave m | Wave period sec. | Output kW/m | Hours/Year |
|---|---|---|---|
| <0.5 | — | — | 966 |
| 1 | 4 | 2 | 4103 |
| 2 | 5 | 12 | 1982 |
| 3 | 6 | 32 | 944 |
| 4 | 7 | 66 | 445 |
| 5 | 8 | 115 | 211 |
| >5.5 | | >145 | 119 |

Thus, during slightly less than half the time the height of the waves is about 1 m, producing an output of 2 kW/m. However, the most energy is available from wave heights in the region of 2–5 meter, taking into consideration that the output increases greatly with increased wave height.

Various types of wave-power units have been proposed to utilize the energy available from the wave movement in the ocean for generating electric power. However, these have been unsuccessful in competing with conventional production of electric power. Wave-power plants realized so far have been primarily experimental plants or have been used to supply power locally for navigation buoys. If commercial production of electricity is to be possible, thus providing access to the vast reserve of energy in the movement of ocean waves, is it not only necessary to place the units in suitable spots, it is also necessary for the unit to be reliable in operation, highly efficient and low in manufacturing and running costs.

Many of the known devices for generating electric power from wave energy are based on principles according to which water is pumped or air compressed in order to drive a generator turbine. Several links are thus involved in the energy conversion process, which affects the total efficiency negatively. Such units are also complicated, and thus expensive.

It is also already known to use an electric linear generator which is directly connected to a floating body. This avoids many of the drawbacks mentioned above.

From certain aspects, however, a rotating generator offers advantages over a linear generator.

Besides the above-mentioned types of units with generators driven by turbines it is also already known to directly transmit the wave movements to a rotating electric generator. However, this is only for supplying energy locally and the output is relatively little. Thus, a light buoy is known through U.S. Pat. No. 5,176,552 that is supplied with energy from the movement of the buoy in the waves. A rotating electric generator is thus arranged inside the light buoy. The rotor of the generator is connected by a cable with a substantially stationary plate located deep down in the water. When the buoy is moved up and down by the waves, this cable causes the rotor to rotate. For several reasons this device is not very suitable for producing electric power to supply an electric supply network of a financially interesting size.

The object of the present invention is, in the light of the above, to produce a wave-power unit of the relevant type which fulfils the demands for high efficiency, reliable operation and cost effectiveness, and enables the generation of electric power for supply to an electric supply network.

SUMMARY OF THE INVENTION

The objective set has been achieved in accordance with the first aspect of the invention in that the wave-power unit comprises the special feature that a mechanical movement transmitting means is arranged to transmit vertical movements of the floating body to rotary movements of the rotor.

Thanks to the movement transmitting means a rotary movement is obtained which enables the use of a rotating electric generator. The rotary movement is normally oscillating since the linear movement is to and fro.

The unit in accordance with the invention thus enables the advantages of a rotating electric generator to be exploited without the intermediate energy conversion steps required by known applications, and this in such a manner that generation of electric power on a larger scale is financially practicable.

In accordance with a preferred embodiment of the claimed wave-power unit at least the stator of the generator is enclosed in a housing anchored in the sea/lake bed.

Enclosing the generator or only its stator in a watertight housing means that it is protected from attack by the surrounding salt water or the influence of living organisms in the water such as acorn barnacles. It also enables the use of a relatively simple generator of standard type. Anchoring the generator in the sea bed via the housing fixes the position of the generator in relation to the floating body and enables optimal utilization of the vertical movements of the floating body.

In accordance with another preferred embodiment the rotor is also enclosed in the housing.

The whole generator is thus protected from corrosion and the advantages of the enclosure are thus exploited to a greater extent.

In accordance with yet another preferred embodiment the rotor is situated on the outside of the stator.

Although a conventional placing with the rotor inside the stator is in most cases preferable, in certain cases the embodiment with the stator outside enables simpler transmission of the linear movement of the floating body to rotary movement of the rotor.

In accordance with another preferred embodiment the rotor is connected to a turning body, which turning body is connected to the movement transmitting means.

The turning body enables efficient conversion of the linear movement to rotary movement to be achieved in a very simple way and allows considerable freedom of design to achieve this. It also creates excellent opportunity for achieving an optimal movement pattern of the rotor.

In accordance with yet another preferred embodiment the turning body is arranged outside the housing.

The lead-in through the housing for transmitting the movement will therefore be advantageous from the sealing point of view since in this embodiment it can be designed as a lead-in for a rotating, but otherwise stationary, shaft. This entails least sealing problems.

In accordance with still another preferred embodiment the unit comprises a first gear mechanism effecting a gear change between the movements of the turning body and the rotor.

Thanks to the gear mechanism the peripheral speed of the rotor can be increased so that the frequency of the induced voltage is increased. This is advantageous since the speed of the linear movement is relatively slight.

In accordance with a further embodiment of the claimed wave-power unit the movement transmitting means is secured by its upper end to the floating body and by its lower end to the turning body so that at least the lower part of the movement transmitting means consists of a component that can be rolled up, e.g. a cable.

In such an embodiment the conversion from linear movement in the floating body to rotary movement in the turning body takes place in a structurally simple manner and with slight losses. At the same time such a design permits the conversion to take place directly in both directions, i.e. up/down-clockwise/counter-clockwise. This is because the cable is wound onto or off the turning body. It will be understood that the windable component may naturally be of some other type such as a wire, chain, tape or the line.

In accordance with a further embodiment the turning body and the rotor are arranged on a common, substantially horizontal shaft.

Since these two components are arranged on a common shaft the rotary movement is transmitted substantially without losses and the horizontal orientation of the shaft enables easy conversion of the vertical movement of the floating body to the rotary movement of the turning body.

In accordance with yet another preferred embodiment the turning body has circular cross section and the diameter of the rotor is larger than that of the turning body. It is particularly advantageous for the diameter of the rotor to be several times greater than that of the turning body.

Thanks to the rotor having a larger diameter than that of the turning body, the peripheral speed is increased without the need for any special extra gear mechanism since the difference in diameter per se constitutes the gear mechanism. Since the linear movement of the floating body takes place at moderate speed, in the order of 0.5–0.8 m/s, an increase is desirable in order to increase the frequency of the induced voltage.

In accordance with another preferred embodiment the movement transmitting means is secured by its upper end to the floating body and by its lower end to the rotor, at least the lower part of the movement transmitting means consisting of a component that can be rolled up, such as a cable or the like.

The movement transmitting means can thus be attached directly to the rotor, which may be a practical solution if the rotor is arranged outside the stator. The construction will thus be very simple and have a minimum number of movable parts.

In accordance with yet another preferred embodiment spring means is arranged to exert a torsional force on the rotor.

Applying such a spring means allows the movement transmitting means to be of simple design since it is sufficient for it to be unidirectional and is only active during upward movement of the floating body. During this movement the spring is stretched and its stored energy is used to rotary the rotor during the downward movement of the floating body.

In accordance with a further preferred embodiment the spring rate of the spring means is adjustable.

The spring can thus be adjusted to suit the wave conditions as regards wave height and velocity so that resonance is achieved between the movement of the floating body and the spring. This minimizes disturbances in the movement and enables current to be induced in a uniform and harmonious manner.

In accordance with another preferred embodiment the housing is secured to a base plate arranged to rest on the bed of the sea/lake.

Since the housing is applied on the sea bed the generator will be stable and substantially unaffected by underwater currents. The base plate may have relatively large mass, which also increases stability.

In accordance with yet another preferred embodiment the length of the movement transmitting means is adjustable.

This allows, for instance, for adjustment to different levels of the surface of the sea/lake as in the case of tidal waters.

In accordance with yet another preferred embodiment the housing is filled with a liquid.

This embodiment is particularly significant if the generator is placed in relatively deep water since the pressure difference would otherwise make it complicated to efficiently seal the housing. If the housing is filled with a liquid of a type less aggressive than salt water, the risk is substantially eliminated of it later penetrating, even with comparatively simple bushings on the housing. The generator is also cooled by the liquid. The liquid should suitably have the same pressure as the surroundings.

In accordance with yet another preferred embodiment the housing is primarily made of concrete.

Concrete is the cheapest possible material that could be used in this context. Furthermore, in many cases it is important for the unit to have a high ballast weight and the material costs are then of considerable significance.

In accordance with yet another preferred embodiment the floating body is connected via the movement transmitting means to a plurality of generators.

Such duplication or multiplication on the generator side may in certain cases lead to a totally more economic unit since each generator can be an entirely standard unit and, depending on the locality, a suitable number can be connected to one and the same floating body.

In accordance with yet another preferred embodiment the stator windings are connected to a rectifier. This rectifier is suitably arranged close to the linear generator below the surface of the water.

In accordance with yet another preferred embodiment the generator is arranged to produce a voltage of varying frequency. This is because, after being rectified, the output signal is a bipolar DC voltage.

The generator is thus suited to the movement pattern created in the rotor by the wave movements, the speed varying depending on where in a wave cycle the floating body is and on superimposed variations in the movement of the wave surface.

In accordance with yet another preferred embodiment the movement transmitting means comprises a second gear mechanism to effect a gear change of the vertical movement of the floating body.

This offers a supplementary or alternative method of increasing the frequency of the induced voltage.

In accordance with yet another preferred embodiment the unit comprises a free wheel arranged to convert oscillating rotary movement to unidirectional rotary movement.

Admittedly this embodiment introduces yet another component in the unit. However, it instead offers the advantage of simpler stator winding design and results in a cleaner profile of the induced voltage.

In accordance with yet another preferred embodiment the stator winding consists of a cable comprising a current conductor, a first semi-conducting layer surrounding the conductor, an insulating layer of solid insulation surrounding the first semi-conducting layer, and a second semi-conducting layer surrounding the insulating layer.

A winding of this type can endure current of extremely high voltage being induced. The need of a transformer between the generator and the electric supply network to which the power is being supplied can thus be eliminated. This is particularly important in the environment in which the invention is used.

The advantageous embodiments of the claimed wave-power unit described above are defined in the claims subordinate to claim 1.

The claimed wave-power unit is well suited for combination with several similar units to form a wave-power plant. The second aspect of the invention thus relates to such a power plant wherein the stator winding of each wave-power unit is connected via a rectifier to an inverter which is common to a plurality of wave-power units, which inverter is arranged to supply energy to an electric supply network.

The claimed wave-power plant provides a practically realizable solution for a system to produce electric current on a larger scale using units of the type claimed, thereby exploiting their advantages, and in which the conversion to DC and then AC creates favourable transmission conditions.

In accordance with a preferred embodiment of the claimed wave-power plant at least one electric switchgear station is connected to the wave-power unit, which switchgear station comprises a watertight container enclosing switchgear components, which container is anchored in the sea bed.

In order to obtain economic energy production from generator units at sea that utilize wave movement, it is important to effect technical optimization not only of the generator unit but also of the complete system required to transmit the energy from each energy source to an electric network for transmission and distribution. An important aspect here is that the wave-power plant is located some distance off shore, which distance is sometimes considerable.

Thanks to its connection to a switchgear station so designed, it can be placed close to the generator unit. This minimizes losses and enables the energy from a plurality of wave-power units to be transferred via a simple common cable connected to the electric supply network on land. This offers a comprehensive solution where both the wave-power unit and the switchgear station can be constructed as standard modules using standard components. Besides being economic in both construction and operation, a power plant in accordance with the invention also offers advantages from the environmental aspect since no switchgear buildings need be built in environmentally sensitive coastal areas.

In accordance with another preferred embodiment the system comprises a plurality of switchgear stations wherein each is connected to a number of wave-power units. Such an embodiment may sometimes be advantageous if the number of units is large.

In accordance with yet another preferred embodiment each switchgear station is connected to a receiving station arranged on land.

In accordance with yet another preferred embodiment at least one of the switchgear stations, normally all of them, comprises a step-up transformer. Alternatively, or as well, a step-up transformer is arranged in the intermediate station. Transmitting the energy at an increased voltage level achieves more favourable transmission both from the technical and the financial aspect.

In accordance with yet another preferred embodiment the switchgear stations and/or the intermediate station comprise(s) a converter. The voltage can thus be favourably transmitted as AC.

In accordance with yet another preferred embodiment the switchgear stations and/or the intermediate station comprise(s) means for storing energy. The system can then easily adjust the power supplied depending on fluctuations in available power and power required.

In accordance with yet another preferred embodiment the switchgear stations and/or the intermediate station comprise(s) filtering means for filtering outgoing and/or incoming current and voltage. The voltage supplied by generator units of the type in question may in many cases be unstable and may vary as to frequency and amplitude, as well as containing heterodyne frequencies. The arrangement of filtering means eliminates these defects or at least reduces them so that a clean voltage, free from disturbance, is transmitted to the network.

In accordance with yet another preferred embodiment the switchgear stations and/or the intermediate station is/are filled with a non-corrosive, buffered liquid. This prevents aggressive salt water from penetrating, and the components in the switchgear and intermediate stations are protected.

In accordance with yet another preferred embodiment a filter and/or a transformer is/are arranged after the inverter. This ensures that a clean, ideal voltage can be supplied and that it can be conveyed further to a transmission or distribution network with suitably stepped-up voltage.

In accordance with yet another preferred embodiment the filter and/or transformer is/are arranged on land.

This offers a more suitable solution from the plant and operating aspects than if these components were to be situated at sea.

In accordance with yet another preferred embodiment each wave-power unit is connected to the inverter via a cable arranged on or close to the sea or lake bed.

Since the cable is arranged close to the sea bed there is less risk than otherwise of it causing any disruption to the surroundings or being tampered with.

The advantageous embodiments of the claimed wave-power plant described above are defined in the subordinate claims to claim 24.

In a third aspect of the invention the objective set is achieved by the use of the claimed wave-power unit or the wave-power plant for generating electric power, thereby gaining advantages of the type indicated above.

The objective set is achieved in a fourth aspect of the invention in that a method of the kind described in the preamble to claim 37 comprises the special measures of enclosing at least the stator of the generator in a watertight housing, anchoring the housing in the sea/lake bed, and arranging mechanical movement transmitting means to transmit vertical movements of the floating body to rotary movements of the generator rotor.

In accordance with a preferred embodiment the claimed method is utilized while making use of the wave-power unit and the preferred embodiments thereof.

Advantages are thus gained equivalent to those described above for the wave-power unit and its preferred embodiments.

In accordance with another preferred embodiment of the claimed method the spring rate is adjusted so that resonance is obtained with the movement of the floating body that is estimated to occur for most of the time.

In accordance with yet another preferred embodiment the energy generated is conducted to a switchgear station, the components of which are arranged in a watertight container, which container is anchored in the sea bed.

The preferred embodiments of the claimed method described above are defined in the subordinate claims to claim 37.

The invention is described in more detail in the following detailed description of advantageous examples thereof, with reference to the accompanying drawings.

BRIEF DESCRIPTION OF THE DRAWINGS

FIG. 7 is a schematic view from the side of a generator in accordance with an alternative embodiment of the invention.

FIG. 8 shows a view from the side of a component in a unit in accordance with one embodiment of the invention.

FIG. 9 is a side view of another alternative embodiment of the unit in accordance with the invention.

FIG. 10 is a diagram illustrating another component of a unit in accordance with an embodiment of the invention.

FIG. 11 is a diagram illustrating another component.

FIG. 14 illustrates an alternative method of connecting the wave-power unit to a supply network.

FIGS. 15–18 are charts illustrating various examples of converting the voltage in a power plant in accordance with the invention.

FIG. 19 illustrates an alternative rectifying example.

DESCRIPTION OF THE INVENTION

Figure 1:
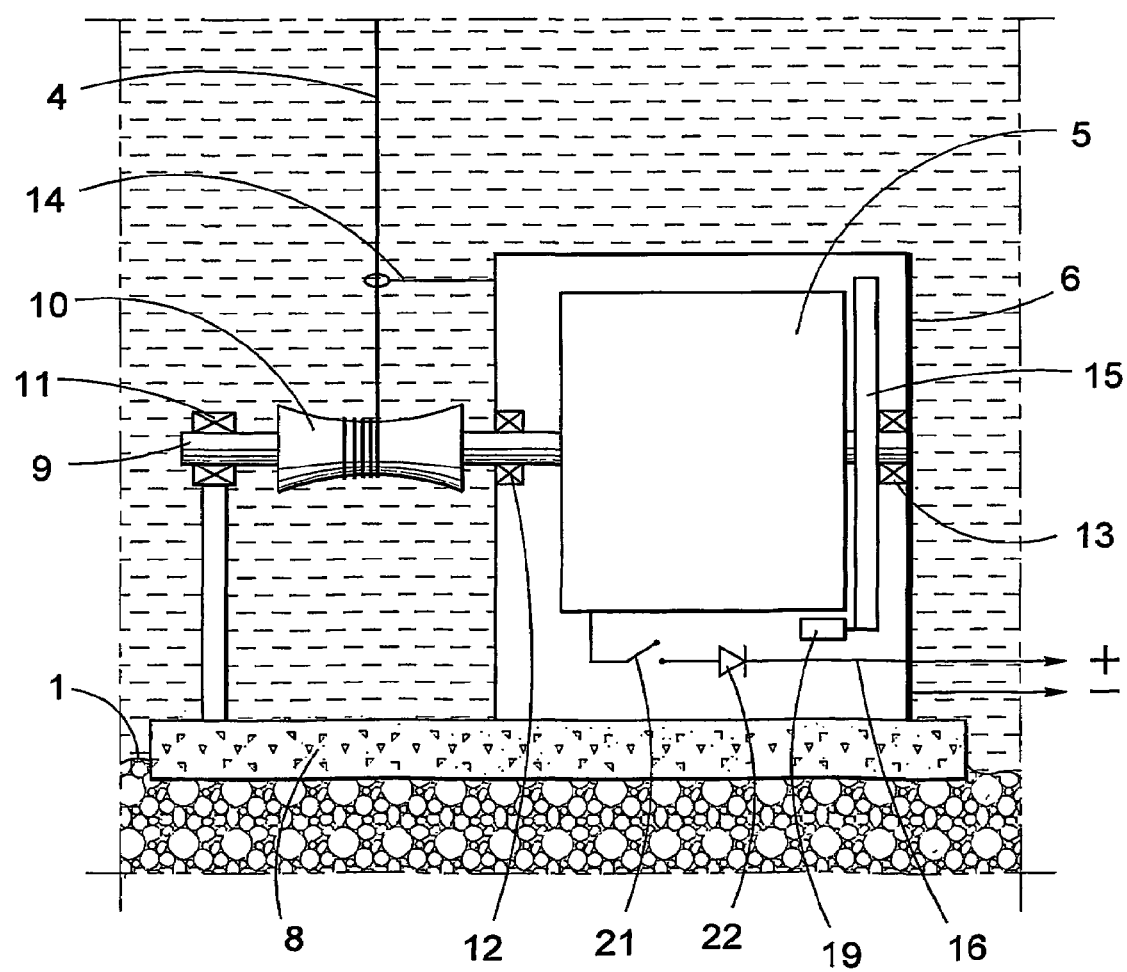
FIG. 1 is a schematic view from the side of a wave-power unit in accordance with the invention.

FIG. 1 shows a side view of a wave-power unit in accordance with the invention. A floating body 3 is arranged to float on the surface 2 of the ocean. An electric synchronous generator 5 with permanent magnet rotor is anchored via a base plate 8 secured in the sea bed. The generator 5 is arranged in a liquid-tight housing for by the base plate 8 and a cover 6. The housing is proof against salt water and watertight. It may possibly be filled with a gas or a liquid. The rotor shaft 9 of the generator 5 extends out through a sealed lead-in in one wall of the housing. A turning body 10 is fixed to the protruding part of the rotor shaft 9. The turning body 10 is in the form of a circular cylinder with concave envelope surface. The shaft is rotatably supported by a first bearing 11 arranged at the side of the turning body 10 facing away from the housing, and a second bearing 12 and third bearing 13 arranged at each side of the housing.

A cable 4 is secured by one end to the floating body 3 and by its other end to the turning body 10. The cable 4 is secured to the turning body 10 in such a way that it can be wound onto the body. A cable guide 14 is attached to the housing, through which the cable 4 runs. A spring 15 is arranged to exert a torsional force on the rotor shaft 9 in a first direction of rotation. The spring may be a cylindrical helical spring of the watch spring type. A spring may also be arranged at the other side of the generator. The spring rate can be controlled by a control device 19. The control device is suitably radio-controlled.

Wave movements at the surface 2 of the ocean impart a to-and-fro vertical movement to the floating body 3. When the floating body 3 is in a wave trough, part of the cable will be wound around the turning body 10. When the floating body is lifted from this position by wave movement the cable runs off the turning body 10 so that this is caused to rotate in a direction opposite to that of the spring 15, the latter therefore being tightened. This continues until the floating body 3 has reached the crest of a wave. During the following downward movement of the floating body 3 the spring 15 placed under tension by the upward movement will turn the turning body in the opposite direction so that the cable is wound onto the turning body. A resonance working point can be obtained by adjusting the spring. The movements of the floating body 3 are thus converted to an oscillating rotary movement of the turning body 10, and thus also of the rotor of the generator 5.

A cable 16 is connected to the stator winding of the generator and, via a cable lead-in, carries the current outside the housing. Inside the housing the cable is provided with a circuit breaker or contactor 21 and a diode 22 for rectification. The diode may be controlled by a thyristor, IGBT or GTO, for instance, or it may be uncontrolled.

Components for monitoring and control may also be arranged in the housing.

Figure 2:
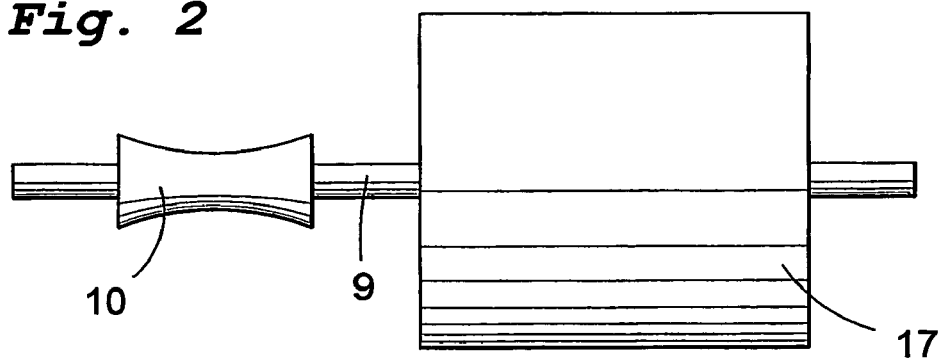
FIG. 2 illustrates the turning body and rotor of a unit in accordance with the invention.
Figure 3:
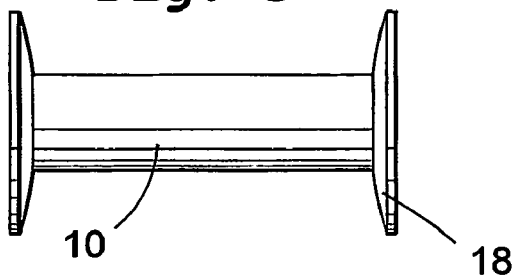
FIGS. 3 and 4 show alternative embodiments of the turning body.
Figure 4:
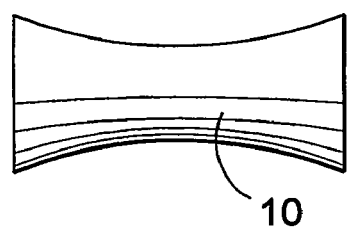

As shown in FIG. 2, the turning body 10 has a diameter considerably less than that of the rotor 17. FIGS. 3 and 4 illustrates a couple of alternative embodiments of the turning body. In FIG. 3 the turning body 10 is provided with end flanges 18 to ensure that the cable does not slip off. In the example shown in FIG. 4 this is achieved by the turning body 10 being concave as seen in a longitudinal section.

A gear exchange is thus obtained that gives the rotor a peripheral speed which is correspondingly greater than the peripheral speed of the turning body. Mechanism for additional step-up may naturally be arranged.

A wave-power plant in accordance with the invention consists of two or more units of the type described above. FIG. 5 illustrates how these are connected together to supply energy to an electric supply network. In the example shown the power plant consists of three units, symbolically designated 20a–20c. Each unit is connected via a breaker or contactor 21 and a rectifier 22 to an inverter 23 in a bipolar connection according to the figure. The circuit diagram is only drawn in for the unit 20a. It will be understood that the other units 20b, 20c are connected in corresponding manner. The inverter 23 supplies three-phase current to the electric supply network 25, possibly via a transformer 24 and/or a filter.

The rectifiers may be diodes, which may be controlled and of type IGBT, GTO or thyristors, comprise controlled bipolar components or they may not be controlled. The voltages on the DC side may be connected in parallel or in series, or a combination of both.

Figure 5A:
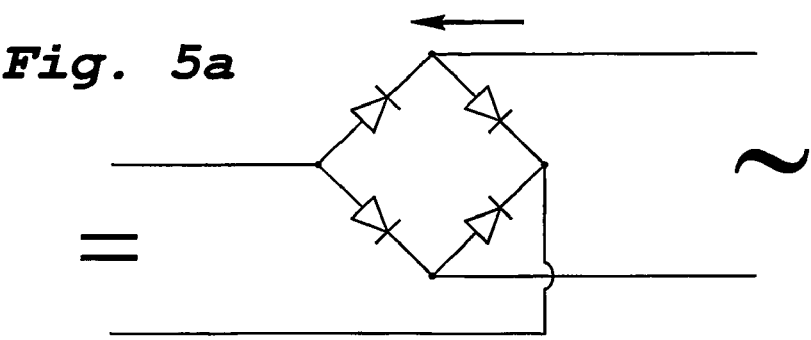
FIG. 5a shows an alternative rectifying example.
Figure 5:
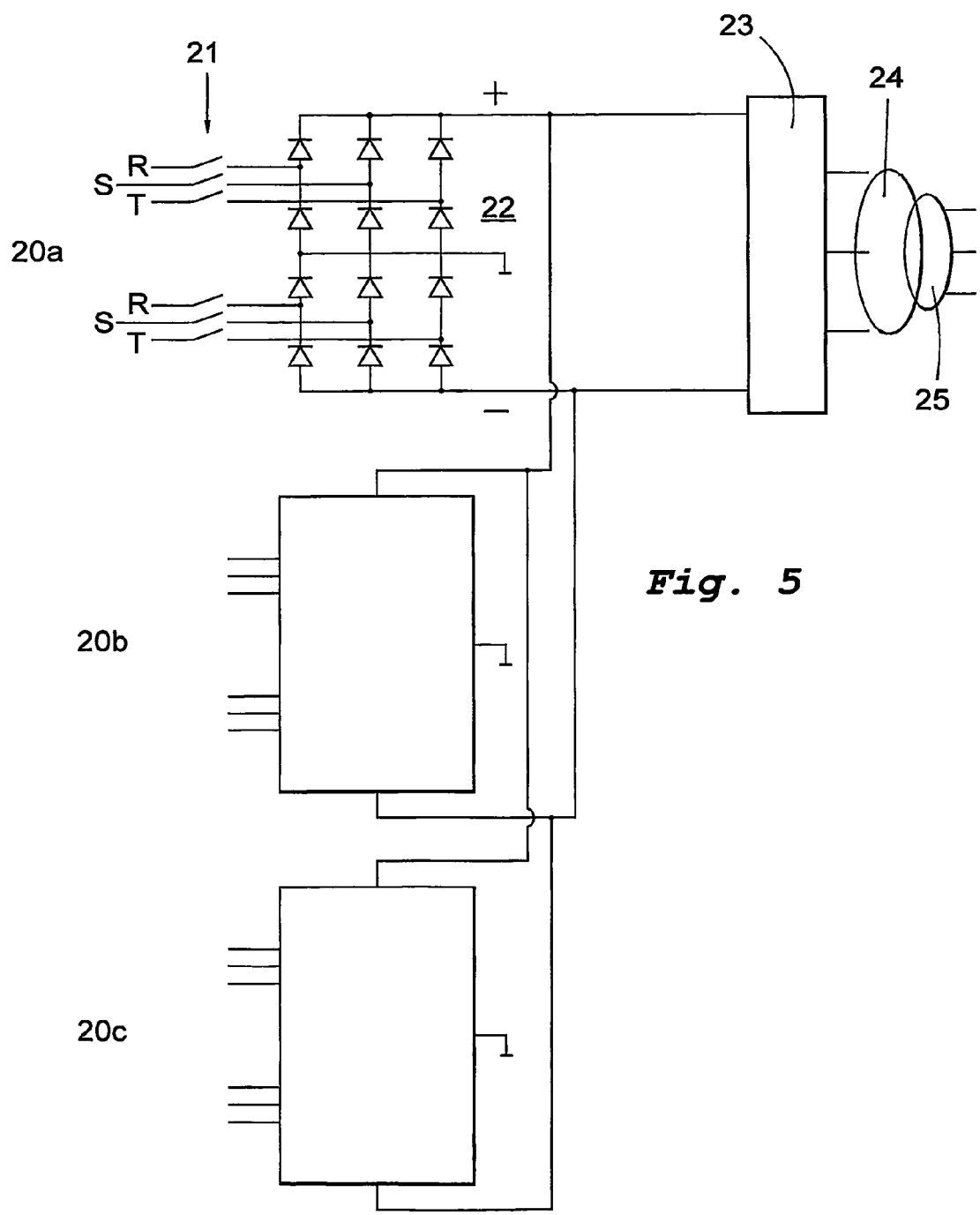
FIG. 5 is a circuit diagram illustrating how a plurality of units are combined to form a wave-power plant.

Alternatively a full-wave rectifier of the type illustrated in FIG. 5a may be used.

Figure 6:
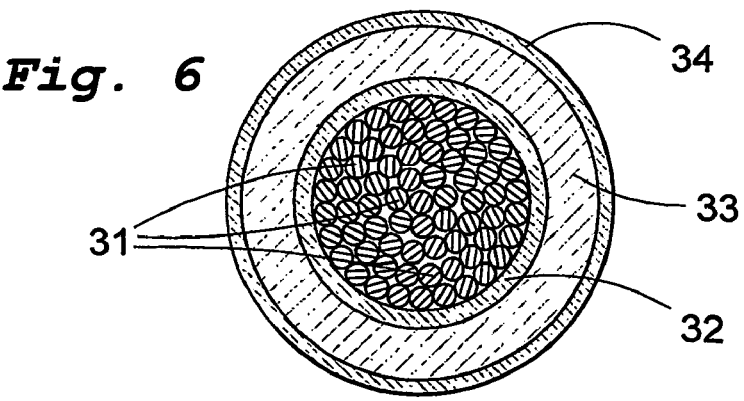
FIG. 6 is a cross section through a cable in the stator winding in accordance with one embodiment of the invention.

FIG. 6 shows a cross section through a high-voltage cable that may be advantageous to use for the stator winding in certain applications of the invention. The cable consists of a core with one or more strand parts 31 of copper. The core is surrounded by an inner semiconducting layer 32. Outside this is a layer of solid insulation 33, e.g. PEX insulation. Around the insulation is an outer semiconducting layer 34. Each of the semiconducting layers forms an equipotential surface.

FIG. 7 illustrates schematically, seen from the side, an alternative embodiment of the generator in a wave-power unit in accordance with the invention. In this example only the stator is enclosed in the housing 6 which may be of concrete. The rotor 17 is thus not enclosed. It is located outside the stator. Vertical movements of the floating body are here transmitted directly to the rotor 17 since the cable 4 is attached to the outside of the rotor. When the floating body (not shown in this figure) moves up and down, the cable is wound off and on to the rotor 17 so that this performs an oscillating rotary movement. The rotor is journalled directly on the outside of the housing 6.

FIG. 8 illustrates how the cable 4 is provided with a control device controlling its active length, i.e. the distance between the floating body 3 and the generator 6. In this case the control device consists of a roll 29 secured to the floating body, onto which roll a part of the cable can be wound. The control device may also be designed in some other way or may alternatively be arranged at the connection point of the cable to the rotor, or somewhere else along the cable. The control device allows the length of the cable to be adjusted to varying tidal water conditions. It can also be used to position the floating body immediately below the surface of the water. When the connecting means is of some other type than a cable, wire, chain or jointed rods, a control device suitable for the particular type shall be used.

FIG. 9 shows an example in which a floating body 3 is common to two separate generators 6a, 6b. The cable 4 is connected to a horizontal rod 38 which, via cables 4a, 4b, is connected to respective generators 4a, 4b.

FIG. 10 illustrates an embodiment in which the cable is provided with a piston mechanism. In the embodiment shown the piston mechanism consists of a first piston 30 secured to the upper part 4d of the cable and arranged to sealingly move up and down in a container 32 filled with liquid, and of a second piston 31 connected to the lower part 4c of the cable and similarly arranged to move up and down in the container 32. The first piston 30 connected to the cable 4d and the part of the container 32 cooperating therewith have larger diameter than the second piston 31 connected to the cable 4c and the part of the container 32 cooperating with this piston. The position of the container is suitably fixed. With this arrangement a ratio is obtained between the vertical movement of the upper cable 4d and the vertical movement of the lower cable 4c that corresponds to the area ratio between the pistons. The piston mechanism may alternatively be designed as a link system, toothed wheel or using screws of different pitch. The piston mechanism may also be designed so that adjustment of the piston ratio is possible.

FIG. 11 illustrates how the turning body 10 is connected to the rotor 17 via a free wheel 28. The free wheel 28 is arranged to convert the oscillating rotary movement of the turning body 10 to unidirectional rotary movement of the rotor 17.

Figure 12:
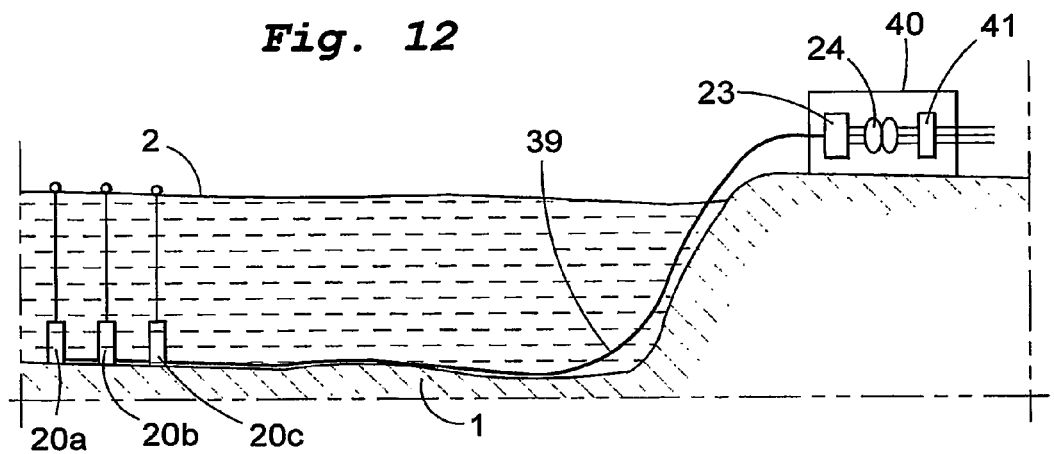
FIG. 12 illustrates how the wave-power unit forms a wave-power plant and how it is connected to an electric supply network.

FIG. 12 illustrates a wave-power plant with a plurality of generators 20a, 20b, 20c interconnected. A rectifier is arranged at each generator and, via cables 39 arranged on the sea bed, the DC current is conducted to a station on land with an inverter 23, a transformer 24 and a filter 41 from whence the electric power is supplied to a distribution or transmission network. The transformer may be omitted if a winding of the type shown in FIG. 6 is used.

Figure 13:
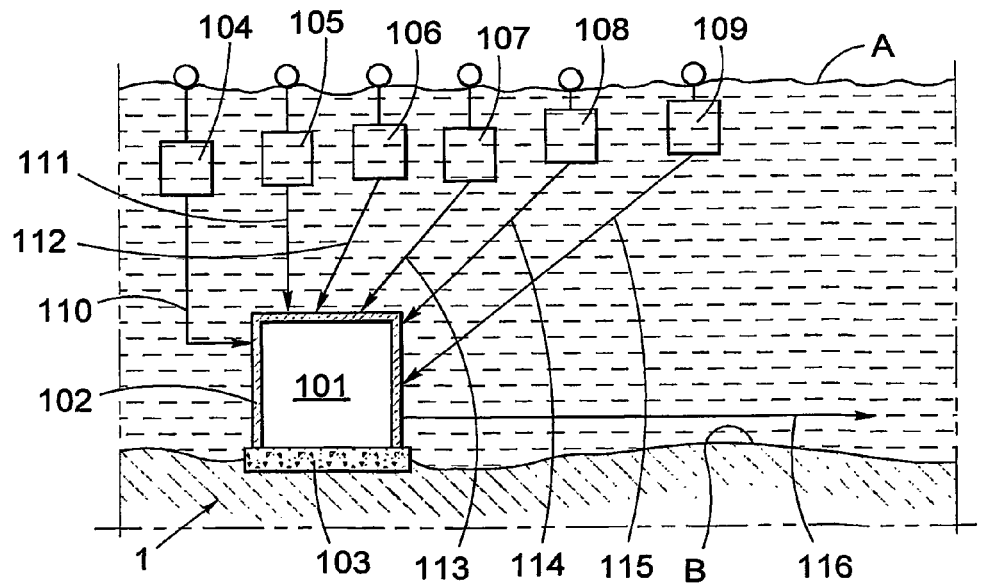
FIG. 13 illustrates a side view of the wave-power unit connected to a switchgear station.

FIG. 13 is a basic layout sketch illustrating another advantageous embodiment of the invention. A switchgear station 101 is arranged resting on the sea bed B. The switchgear station 101 consists of a watertight container formed by a housing 102 and a bottom plate 103 which may be of concrete, for instance. The switchgear station 101 is anchored in the sea bed B. The generators 104–109 of a number of wave-power units are connected to the switchgear station.

Each generator unit 104–109 is electrically connected with the switchgear station 101 by cables 110–115 which, via lead-ins through the housing 102, are connected to the components inside the switchgear station. The voltage is supplied from each unit as low-voltage direct or alternating voltage.

The components in the switchgear station 101 are of conventional type and are not shown in the figures. These components may include semiconductors, converters, breakers, measuring devices, relay protection, surge diverters and other over-voltage protection devices, earthing means, load couplers or disconnectors, as well as transformers.

The switchgear station supplies an outgoing direct or alternating voltage, preferably high voltage, through outgoing cables 116. The alternating voltage has low frequency and may be three phase or multiphase. Standard frequencies such as 50 or 60 Hz may also be used.

The incoming low voltage is converted to outgoing high voltage by the transformer in the switchgear station. The converter or inverter in the switchgear station is used when necessary to converter DC-AC or vice versa.

The voltage is supplied to a receiving station located on land, possibly via an intermediate station, to be fed out on an electric supply network.

FIG. 14 illustrates an example of a system in accordance with the invention that may be expedient when a large number of generator units is included in the system. The figure is a symbolic representation of the system seen in bird's eye perspective and shows a sea area H on the left of the figure and a land area L on the right. The components on the left of the figure are located partly under and partly above the surface of the water.

The system comprises a first group of generator units 104a–106a, a second group of generator units 104b–106b and a third group of generator units 104c–106c. The generator units 104a–106a in the first group are connected via under-water cables to a first switchgear station 101a located below the surface of the water. Similarly, the two other groups of generators 104b–106b and 104c–106c are connected to a second switchgear station 101b and a third switchgear station 101c, respectively. Each of the switchgear stations 101a–101c is connected via under-water cables 116a–116c to an intermediate station 117, also located below the surface of the water. The voltage is conducted from the intermediate station 117 as low-frequency three-phase alternating voltage via under-water cables 118 to a receiving station 119 located on land. The voltage is converted in the receiving station to a standard frequency such as 50 or 60 Hz.

The distance between the generator units and the receiving station may be from a kilometer or so up to many tens of kilometers. When the system is constructed as shown in FIG. 14 the distance between on the one hand switchgear station and intermediate station and on the other hand intermediate station and receiving station, can be optimized.

Transmission from the generator units to a receiving station on land may take place in various ways with various voltage conversions. FIGS. 15 to 18 illustrate schematically some examples of this. In each example the generator units are arranged to the left and the receiving station on land L to the right in the figures. 121 denotes a converter/inverter and 122 a step-up transformer. In FIGS. 15 and 16 the generator units supply direct voltage which in FIG. 15 is transmitted to land as alternating voltage and in FIG. 16 as direct voltage.

In FIGS. 17 and 18 the generator units supply alternating voltage which is converted to direct voltage. In FIG. 17 this is transmitted to land as alternating voltage and in FIG. 18 as direct voltage.

Many other alternatives are shown within the scope of the invention, such as a whole-wave rectifier of the type illustrated in FIG. 19.

Energy stores and filters may also be housed in each switchgear station 111 and/or in the intermediate station 117. The energy stores may consist of batteries, capacitors, SMES types, flywheels or combinations thereof, for instance. The filters may comprise active components in similar manner to the converters. Passive LC filters and electro-mechanical components such as flywheel converters or synchronous condensers are also possible.

The invention claimed is:

1. A wave-power unit for the production of electric power comprising:
    floating body and rotating electric generator having a rotor; a mechanical movement transmitting means arranged for transmission of vertical movement of the floating body to rotary movements of the rotor, a turning body connected to the transmitting means, the transmitting means being secured by its upper end to the floating body and by its lower end to the turning body; the lower part of the movement transmitting means including a component that can be rolled up; the turning body having circular cross section and the diameter of the rotor is larger than the turning body.

2. A wave-power unit as claimed in claim 1, wherein at least the stator of the generator is enclosed in a housing anchored in the sea/lake bed.

3. A wave-power unit as claimed in claim 2, wherein the rotor is also enclosed in the housing.

4. A wave-power unit as claimed in claim 1, wherein the rotor is situated on the outside of the stator.

5. A wave-power unit as claimed in claim 1, wherein the turning body is arranged outside the housing.

6. A wave-power unit as claimed in claim 1, comprising a first gear mechanism effecting a gear change between the movements of the turning body and the rotor.

7. A wave-power unit as claimed in claim 1, wherein the turning body and the rotor are arranged on a common, substantially horizontal shaft.

8. A wave-power unit as claimed in claim 1, wherein it is provided with spring means arranged to exert a torsional force on the rotor.

9. A wave-power unit as claimed in claim 8, wherein the spring rate of the spring means is adjustable.

10. A wave-power unit as claimed in claim 1, wherein the housing which base plate is arranged to rest on the bed of the sea/lake.

11. A wave-power unit as claimed in claim 1, wherein the length of the movement transmitting means is adjustable.

12. A wave-power unit as claimed in claim 1, wherein the housing is filled with a liquid.

13. A wave-power unit as claimed in claim 1, wherein the housing is primarily made of concrete.

14. A wave-power unit as claimed in claim 1, wherein the floating body is connected to a plurality of generators.

15. A wave-power unit as claimed in claim 1, wherein the stator winding is connected to a rectifier, which rectifier is preferably arranged close to the generator below the surface of the water, preferably inside the housing.

16. A wave-power unit as claimed in claim 1, wherein the generator is arranged to produce a voltage of varying frequency.

17. A wave-power unit as claimed in claim 1, wherein the movement transmitting means comprises a piston mechanism to effect a gear ratio of the vertical movement of the floating body.

18. A wave-power unit as claimed in claim 1, wherein it comprises a free wheel arranged to convert oscillating rotary movement to unidirectional rotary movement.

19. A wave-power unit as claimed in claim 1, wherein the stator winding consists of a cable comprising a current conductor, a first semi-conducting layer surrounding the conductor, an insulating layer of solid insulation surrounding the first semi-conducting layer, and a second semi-conducting layer surrounding the insulating layer.

20. A wave-power plant comprising a plurality of wave-power units as claimed in claim 1, wherein the stator winding of each wave-power unit is connected via a rectifier to an inverter which is common to a plurality of wave-power units, which inverter is arranged to supply energy to an electric supply network.

21. A wave-power plant as claimed in claim 20, wherein at least one electric switchgear station is connected to the wave-power unit, which switchgear station comprises a watertight container housing switchgear components, which container is anchored in the sea bed.

22. A wave-power plant as claimed in claim 21, wherein a plurality of switchgear stations are connected to the wave-power unit, each switchgear station being connected to a number of wave-power units.

23. A wave-power plant as claimed in claim 21, wherein each switchgear station is connected to a receiving station arranged on land.

24. A wave-power plant as claimed in claim 21, wherein at least one of the switchgear stations comprises a step-up transformer and/or an intermediate station comprising a step-up transformer.

25. A wave-power plant as claimed in claim 21, wherein at least one of the switchgear stations and/or the intermediate station comprises a converter.

26. A wave-power plant as claimed in claim 25, wherein at least one of the switchgear stations and/or the intermediate station comprises filtering means for filtering outgoing and/or incoming current and voltage.

27. A wave-power plant as claimed in claim 21, wherein at least one of the switchgear stations and/or the intermediate station comprises means for storing energy.

28. A wave-power plant as claimed claim 21, wherein at least one of the switchgear stations and/or the intermediate station is filled with non-corrosive, buffered liquid.

29. A wave-power plant as claimed in claim 20, wherein a filter and/or a transformer is/are arranged after the inverter.

30. A wave-power plant as claimed in claim 20, wherein the inverter, filter and/or transformer is/are arranged on land.

31. A wave-power plant as claimed in claim 20, wherein each wave-power unit is connected to the inverter via a cable arranged on or close to the sea or lake bed.

32. A method of generating electric power by mechanically connecting a floating body to a rotating electric generator, wherein mechanical movement transmitting means is arranged to transmit vertical movements of the floating body to rotary movements of the generator rotor, the rotor being connected to a turning body connected to the movement transmitting means, said movement transmitting means being secured by its upper end to the floating body and by its lower end to the turning body, and at least the lower part of the movement transmitting means includes a component that can be rolled up, wherein the turning body has circular cross section and the diameter of the rotor is larger than the turning body.

33. A method as claimed in claim 32, wherein the method is utilized while making use of a wave-power unit.

34. A method as claimed in claim 33, wherein the spring means with adjustable spring rate is applied to exert a torsional force on the rotor and in that the spring means is adjusted so that resonance is obtained with the movement of the floating body that is estimated to occur for most of the time.

35. A method as claimed in claim 32, wherein the energy generated is conducted to a switchgear station, the components of which are arranged in a watertight container, which container is anchored in the sea bed.

36. A method as claimed in claim 35, wherein the switchgear station is connected to a receiving station arranged on land.

37. A method as claimed in claim 36, wherein a plurality of switchgear stations are connected to a common intermediate station, which intermediate station is connected to the receiving station.

38. A method as claimed in claim 35, wherein at least one of the switchgear stations and/or the receiving station is/are arranged below the surface of the water, preferably close to the sea bed.

39. A method as claimed in claim 35, wherein voltage generated is step-up transformed in at least one of the switchgear stations and/or the intermediate station.

40. A method as claimed in claim 35, wherein the outgoing voltage from at least one of the switchgear stations and/or from the intermediate station is alternating voltage.

41. A wave-power unit for the production of electric power comprising:
   floating body and rotating electric generator having a rotor; a mechanical movement transmitting means arranged for transmission of vertical movement of the floating body to rotary movements of the rotor, a turning body connected to the transmitting means, the transmitting means being secured by its upper end to the floating body and by its lower end to the turning body; the lower part of the movement transmitting means including a component that can be rolled up;
   wherein the spring rate of the spring means is adjustable.

42. A wave-power unit for the production of electric power comprising:
   a floating body and rotating electric generator having a rotor; a mechanical movement transmitting means arranged for transmission of vertical movement of the floating body to rotary movements of the rotor, a turning body connected to the transmitting means, the transmitting means being secured by its upper end to the floating body and by its lower end to the turning body; the lower part of the movement transmitting means including a component that can be rolled up; wherein at least a stator of the generator is enclosed in a housing anchored in the sea/lake bed and wherein the housing is filled with a liquid.

* * * * *